(12) United States Patent
Waskiewicz et al.

(10) Patent No.: US 8,555,368 B2
(45) Date of Patent: Oct. 8, 2013

(54) FIREWALL FILTERING USING NETWORK CONTROLLER CIRCUITRY

(75) Inventors: Peter P. Waskiewicz, Hillsboro, OR (US); Patrick Connor, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 12/634,219

(22) Filed: Dec. 9, 2009

(65) Prior Publication Data

US 2011/0138455 A1    Jun. 9, 2011

(51) Int. Cl.
*H04L 29/06* (2006.01)

(52) U.S. Cl.
USPC ............. 726/11; 726/12; 726/13; 726/15; 713/153; 713/154; 370/229; 370/230; 370/395.1

(58) Field of Classification Search
USPC ......................................................... 726/11
See application file for complete search history.

(56) References Cited

U.S. PATENT DOCUMENTS

| | | | |
|---|---|---|---|
| 6,182,228 B1 * | 1/2001 | Boden et al. | 726/13 |
| 6,219,786 B1 * | 4/2001 | Cunningham et al. | 713/152 |
| 6,647,418 B1 * | 11/2003 | Maria et al. | 709/225 |
| 7,215,637 B1 * | 5/2007 | Ferguson et al. | 370/230.1 |
| 7,376,080 B1 * | 5/2008 | Riddle et al. | 370/229 |
| 7,441,262 B2 * | 10/2008 | Hui et al. | 726/1 |
| 7,512,684 B2 | 3/2009 | Ronciak et al. | |
| 7,979,368 B2 * | 7/2011 | Kapoor et al. | 706/20 |
| 8,037,517 B2 * | 10/2011 | Fulp et al. | 726/11 |
| 2006/0007860 A1 * | 1/2006 | Komisky | 370/230 |
| 2007/0022474 A1 * | 1/2007 | Rowett et al. | 726/11 |
| 2007/0022479 A1 * | 1/2007 | Sikdar et al. | 726/22 |

OTHER PUBLICATIONS

Sourdis, Ioannis; Dimopoulos, Vasilis; Pnevmatikatos, Dionisios; Vassiliadis, Stamatis. "Packet Pre-Filtering for Network Intusion Detection". ANCS 2006. Pub. Date: 2006. Relevant pp. 183-192. Found on the World Wide Web at: http://ieeexplore.ieee.org/stamp/stamp.jsp?tp=&arnumber=4579536.*

"Intel® 82599 10 GbE Controller Datasheet", Intel Corporation, Revision No. 2.0, Jul. 2009, including section 7.1.2.7 ("Flow Director Filters"); product believed subject to PRQ announcement on May 15, 2009.

* cited by examiner

*Primary Examiner* — Nathan Flynn
*Assistant Examiner* — Jeremiah Avery
(74) *Attorney, Agent, or Firm* — Christopher K. Gagne

(57) ABSTRACT

An embodiment may include network controller circuitry to be comprised in a host computer that includes a host processor to execute an operating system environment. The circuitry may be coupled to the processor, receive at least one packet via a network, store at least one firewall filter parameter set, and execute, based at least in part upon the parameter set and packet, at least one firewall filter action involving, at least in part, the packet. The action may implement, at least in part, at least one firewall rule supplied by a firewall application to an interface of a driver associated with the circuitry. The application may be executed, at least in part, in the environment. The circuitry may generate and store the parameter set based at least in part upon at least one command from the driver. The command may be based at least in part upon the rule.

19 Claims, 3 Drawing Sheets

FIREWALL FILTERING USING NETWORK CONTROLLER CIRCUITRY

FIELD

This disclosure relates to firewall filtering using network controller circuitry.

BACKGROUND

In one conventional arrangement, a host processor in a host computer executes an operating system. Firewall software agents executed by the host processor (e.g., in association with, and/or as part of the operating system) examine packets received by the host computer to determine which of the packets should be prevented from being processed further by the host computer. Unfortunately, these operations carried out by the software agents and host processor may consume an undesirably large amount of the host processor's processing bandwidth. Also unfortunately, these operations may undesirably increase the host processor's power consumption and heat generation.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
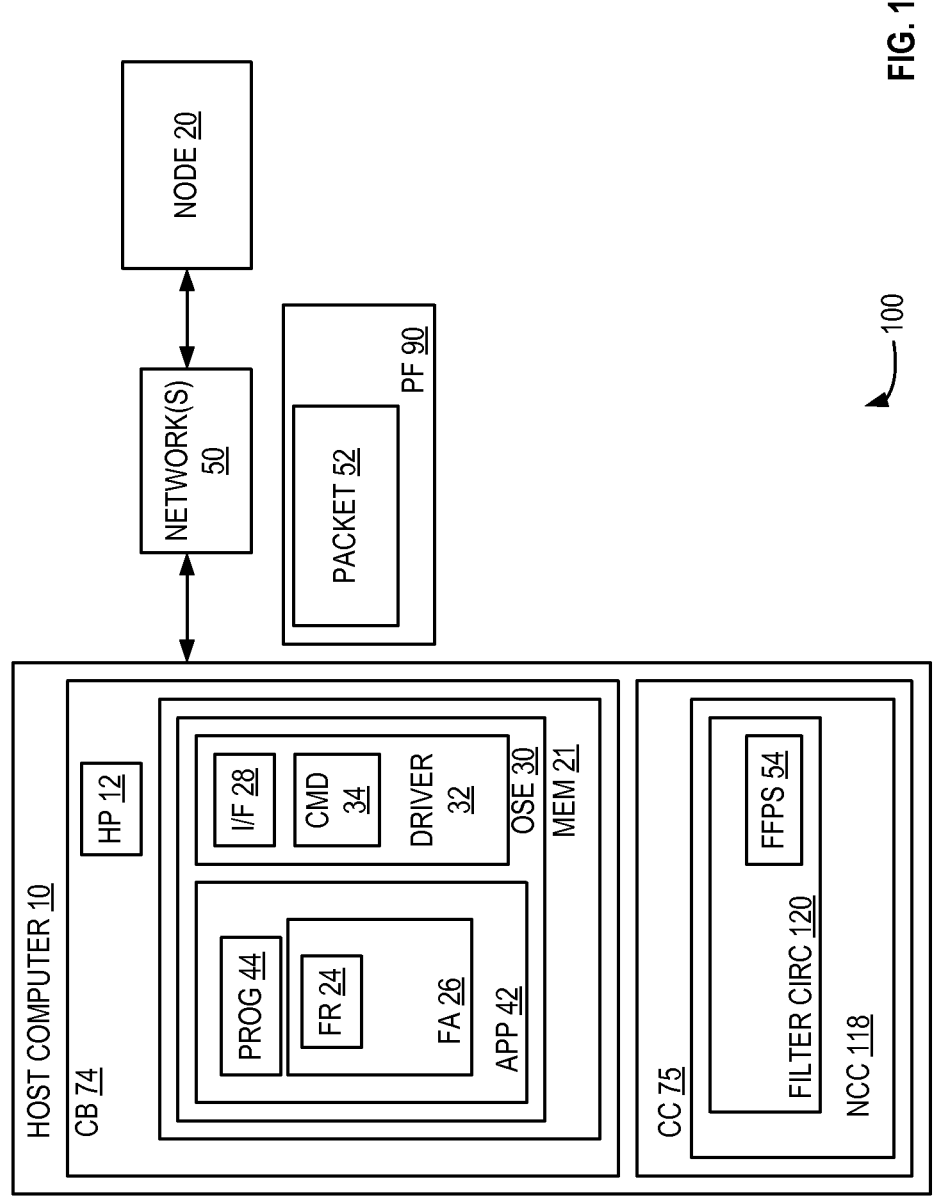
FIG. 1 illustrates a system embodiment.

FIG. 1 illustrates a system embodiment 100. System 100 may include a host computer 10 and a remote node 20 that may be communicatively coupled together via one or more wireless and/or wired networks 50. In this embodiment, the terms "host computer," "host," "server," and "node" may be used interchangeably, and may mean, for example, one or more end stations, appliances, intermediate stations, network interfaces, clients, servers, and/or portions thereof. In this embodiment, a "network" may be or comprise any mechanism, instrumentality, modality, and/or portion thereof that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" means a network that permits, at least in part, at least two entities to be wirelessly communicatively coupled, at least in part. In this embodiment, a "wired network" means a network that permits, at least in part, at least two entities to be communicatively coupled, at least in part, via non-wireless means, at least in part. In this embodiment, data may be or comprise one or more commands (for example one or more program instructions), and/or one or more such commands may be or comprise data. Also in this embodiment, an "instruction" may include data and/or one or more commands.

Host computer 10 may comprise circuit board (CB) 74 and circuit card (CC) 75. In this embodiment, CB 74 may comprise, for example, a system motherboard and may be physically and communicatively coupled to CC 75 via a not shown bus connector/slot system. CB 74 may comprise one or more host processors (HP) 12 and computer-readable/writable memory 21. Although not shown in the Figures, CB 74 also may comprise one or more chipsets (comprising, e.g., memory and/or input/output controller circuitry). One or more host processors 12 may be communicatively coupled via the one or more chipsets to memory 21 and CC 75.

CC 75 may comprise network controller circuitry (NCC) 118. Circuitry 118 may comprise filter circuitry 120 that may store, at least in part, one or more firewall filter parameter sets (FFPS) 54.

Alternatively or additionally, although not shown in the Figures, some or all of circuitry 118 and/or the functionality and components thereof may be comprised in, for example, CB 74 (e.g., in one or more host processors 12 and/or the one or more not shown chipsets). Also alternatively, one or more host processors 12, memory 21, the one or more not shown chipsets, and/or some or all of the functionality and/or components thereof may be comprised in, for example, circuitry 118 and/or CB 75. Many other alternatives are possible without departing from this embodiment.

Although not shown in the Figures, node 20 may comprise, in whole or in part, the components and/or functionality of host computer 10. As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor and a controller each may comprise respective circuitry capable of performing, at least in part, one or more arithmetic and/or logical operations, such as, for example, one or more respective central processing units. Also in this embodiment, a chipset may comprise circuitry capable of communicatively coupling, at least in part, one or more host processors, storage, mass storage, one or more nodes, and/or memory. Although not shown in the Figures, host computer 10 may comprise a graphical user interface system. The not shown graphical user interface system may comprise, e.g., a respective keyboard, pointing device, and display system that may permit a human user to input commands to, and monitor the operation of, host computer 10, node 20, and/or system 100.

One or more machine-readable program instructions may be stored in computer-readable/writable memory 21. In operation of host computer 10, these instructions may be accessed and executed by one or more host processors 12 and/or circuitry 118. When executed by one or more host processors 12 and/or circuitry 118, these one or more instructions may result in one or more drivers 32 associated with NCC 118 and/or operating system environment (OSE) 30 being executed at least in part by one or more host processors 12 and/or NCC 118 and becoming resident at least in part in memory 21. Also when executed by one or more host processors 12 and/or circuitry 118, these one or more instructions may result in one or more host processors 12, circuitry 118, OSE 30 (and/or one or more other applications comprised in OSE 30), and/or one or more drivers 32 performing the operations described herein as being performed by these components of system 100. In this embodiment, an operating system environment may be or comprise one or more portions of one or more operating systems, one or more programs, and/or one or more associated processes. In this embodiment, a portion of an entity may comprise all or less than all of the entity. Also in this embodiment, a driver may comprise one or more program processes. In this embodiment, a process, program, driver, and application may be used interchangeably, and may comprise and/or result at least in part from execution of one or more program instructions. Memory 21 may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

In this embodiment, host computer 10 and node 20 may be geographically remote from each other. Circuitry 118 may be capable of receiving one or more packet flows 90 from node 20 via one or more networks 50 in accordance with one or more protocols. These one or more protocols may be compatible with, e.g., an Ethernet protocol and/or Transmission Control Protocol/Internet Protocol (TCP/IP). In this embodiment, a packet flow may comprise, for example, one or more packets sharing, at least in part, one or more parameters, such as, one or more addresses, ports, and/or other parameters. One or more packet flows 90 may comprise one or more packets 52. In this embodiment, a packet may comprise one or more symbols and/or values.

The Ethernet protocol that may be utilized in system 100 may comply or be compatible with the protocol described in Institute of Electrical and Electronics Engineers, Inc. (IEEE) Std. 802.3, 2000 Edition, published on Oct. 20, 2000. The TCP/IP that may be utilized in system 100 may comply or be compatible with the protocols described in Internet Engineering Task Force (IETF) Request For Comments (RFC) 791 and 793, published September 1981. Of course, many different, additional, and/or other protocols may be used for such data and/or command exchange without departing from this embodiment, including for example, later-developed versions of the aforesaid and/or other protocols.

After, for example, a reset of host computer 10, one or more processors 12 may execute one or more instructions that may result in OSE 30 being executed by one or more processors 12 and in OSE 30 becoming resident in memory 21. In this embodiment, OSE 30 may comprise, for example, one or more applications 42 and/or one or more drivers 32. One or more applications 42 may comprise one or more firewall applications (FA) 26 and/or one or more other programs 44.

FA 26 may include a not shown interface that may permit a human user of host computer 10 to input one or more parameters to FA 26 via the not shown graphical user interface that may define, at least in part, one or more firewall rules (FR) 24 to be used by FA 26. FA 26 may generate and maintain FR 24 based at least in part upon the one or more parameters input by the user. In this embodiment, a rule may specify and/or define, at least in part, one or more actions to be taken based upon, at least in part, one or more occurrences and/or contingencies. FA 26 may supply, at least in part, FR 24 to one or more drivers 32 via one or more interfaces (I/F) 28 of one or more drivers 32. In this embodiment, one or more interfaces 28 may be or comprise, for example, one or more configuration interfaces, tools, and/or utilities for use in configuring, at least in part, NCC 118. In this embodiment, an interface may facilitate, define, and/or invoke, at least in part, one or more functions and/or instrumentalities. For example, in this embodiment, one or more interfaces 28 may be or comprise one or more Linux kernel interfaces (not shown) and/or one or more Microsoft Corporation Windows® Operating System network driver interfaces (not shown).

Figure 3:
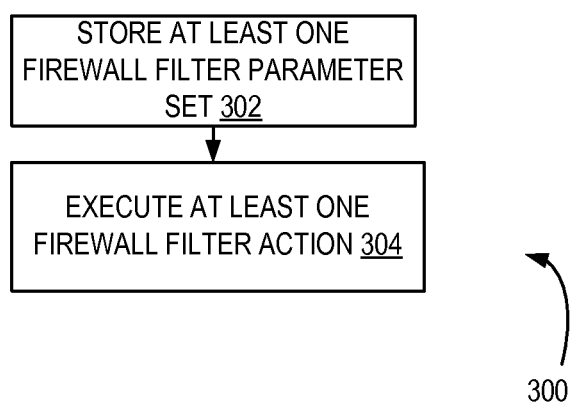
FIG. 3 is a flowchart illustrating operations in an embodiment.

Reference now is being specifically made to FIGS. 1 and 3. FIG. 3 illustrates operations 300 that may be performed in an embodiment. Based at least in part upon one or more FR 24 provided by FA 26, one or more drivers 32 may generate and issue, at least in part, to NCC 118 one or more commands (CMD) 34. In response, and based at least in part upon one or more commands 34, filter circuitry 120 may generate and store, at least in part, in filter circuitry 120 FFPS 54 (see operation 302 in FIG. 3). FFPS 54 may correspond, at least in part, to FR 24.

Figure 2:
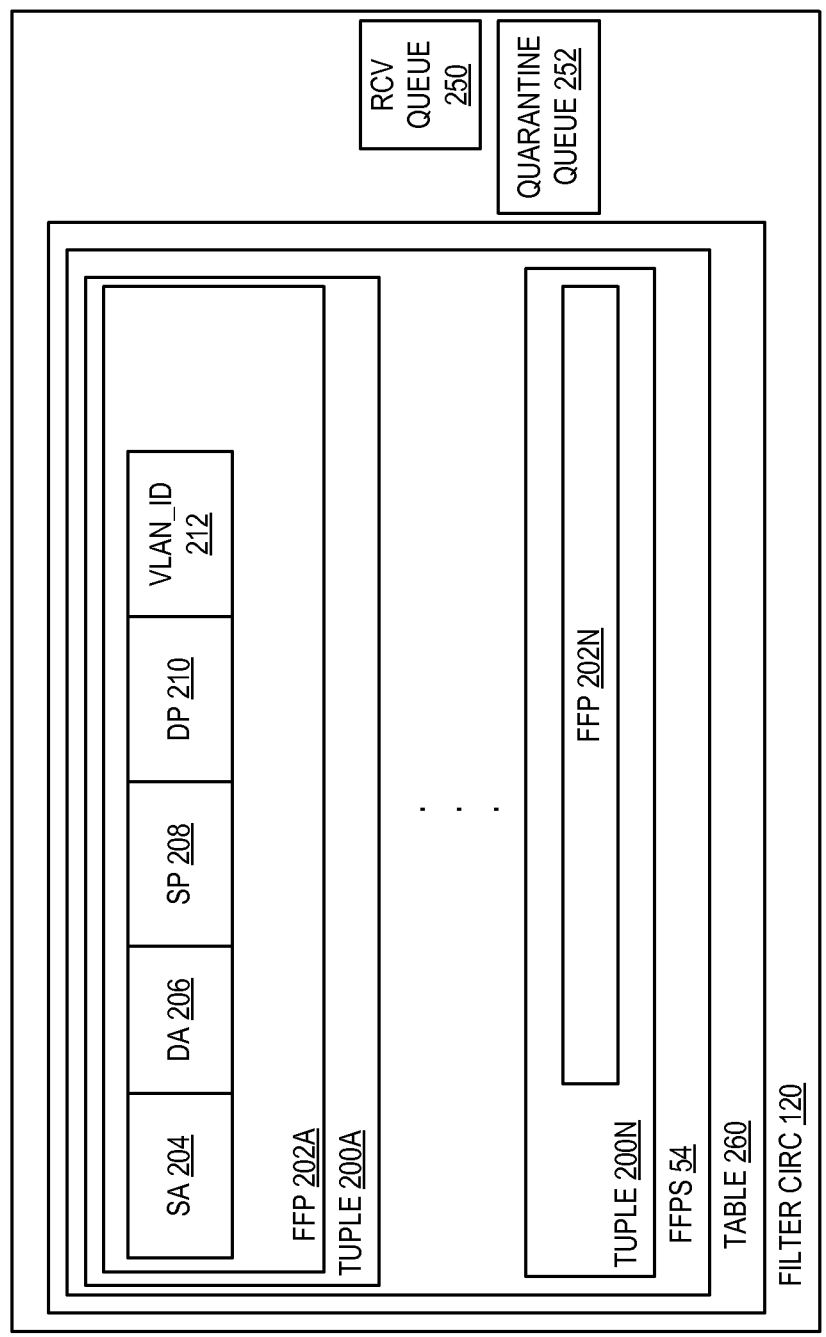
FIG. 2 illustrates circuitry in an embodiment.

FIG. 2 illustrates filter circuitry 120 in an embodiment. Filter circuitry 120 includes one or more firewall filter tables 260, one or more receive queues 250, and one or more quarantine queues 252. One or more tables 260 may include FFPS 54. FFPS 54 may include one or more (and in this embodiment, a plurality of) tuples 200A . . . 200N. Each of the respective tuples 200A . . . 200N may comprise one or more respective firewall filter parameters (FFP) 202A . . . 202N. Each of the respective FFP 202A . . . 202N may specify, at least in part, one or more packet flows that may be subject to FR 24. For example, FFP 202A may specify, at least in part, one or more source addresses (SA) 204, one or more destination addresses (DA) 206, one or more source ports (SP) 208, one or more destination ports (DP) 210, and/or one or more virtual local area network (VLAN) identifiers (VLAN_ID) 212 that singly and/or taken in one or more respective combinations may specify, at least in part, one or more packet flows that may be subject to one or more FR 24. Of course, the number, type, configuration, and/or contents of FFP and/or FFPS may vary without departing from this embodiment. For example, alternatively or additionally, one or more identifiers 212 may be or comprise one or more protocol identifiers that may identify, at least in part, one or more protocols associated with these one or more packet flows.

In this embodiment, a firewall may implement one or more firewall filter actions to be taken in response to one or more types of packets. These types of packets and/or actions may be specified, at least in part, via and/or in one or more firewall rules. These one or more actions may implement, at least in part, the one or more firewall rules with which they are associated. These one or more actions may involve, for example, filtering one or more packets. In this embodiment, filtering of a packet may comprise dropping the packet prior to the packet being placed in packet queue (e.g., receive queue 250) in host computer 10, or placing the packet in a special quarantine queue (e.g., quarantine queue 252) for subsequent examination and/or further action. Also in this embodiment, the dropping of a packet may comprise permitting the packet to be overwritten (e.g., in an initial network buffer), and lost without any further action being taken by the host computer to continue maintaining the packet.

By way of example, FFP 202A may specify, at least in part, one or more packet flows 90. In this example, one or more packet flows 90 may be associated with denial of service attack, virus, or other malicious, unauthorized, or undesirable activity. After circuitry 118 receives, at least in part, one or more packets 52 in one or more packet flows 90, circuitry 120 may examine one or more packets 52 to determine, based upon FFPS 54, one or more tuples 200A . . . 200N, and/or one or more FFP 202A . . . 202N whether one or more packets 52 belong to one or more packet flows 90 that may be subject to FR 24. In this example, based at least in part upon FFP 202A, FFPS 54, and/or the examination of one or more packets 52, circuitry 120 may determine that one or more packets 52 are subject to FR 24. Circuitry 120 then may execute, based at least in part upon FFP 202A, FFPS 54, and/or one or more packets 52, one or more firewall filter actions implementing, at least in part, FR 24 (see operation 304 in FIG. 3).

In this embodiment, depending upon the particular FR 24, circuitry 120 may examine the one or more packets 52 based at least in part upon a subset of FFP 202A . . . 202N. In this embodiment, a subset of an entity may comprise all or a portion of the entity. For example, if the destination address 206 comprises an IP address, when examining the one or more packets 52, circuitry 120 may add an address range of 24-bits to the destination address 206 and may mask the SA 204, SP 208, DP 210, and VLAN_ID 212. This may result in circuitry 120 executing one or more firewall filter actions associated with FFP 202A on any packet having a destination address within the resulting destination address range, regardless of the SA, SP, DP, and VLAN_ID in the packet. Of course, other subsets of FFP 202A . . . 202N and/or other masking configurations are possible.

Thereafter, the one or more firewall filter actions may involve circuitry 120 dropping one or more packets 52 prior to one or more packets 52 being placed in one or more receive queues 250, or placing the one or more packets 52 in one or more quarantine queues 252. While in the one or more quarantine queues 252, other than the processing described herein, no other processing of the one or packets 52 by host computer 10 is permitted. If circuitry 120 places one or more packets in one or more quarantine queues 252, one or more applications 42 may determine, at least in part, at least one further action to be taken involving one or more packets 52. These one or more further actions may involve, for example, further examination by one or more applications 42 and/or FA 26 to determine whether one or more packets 52 pose a threat to host computer 10. Based at least in part upon this further examination, one or more applications 42 and/or FA 26 may determine additional further firewall filter action: either to drop the one or more packets or to permit one or more application programs (e.g., user application programs) 44 to receive the one or more packets 52 for further processing. In either case, circuitry 120 implements the additional further firewall action.

Conversely, if circuitry 120 determines that one or more packets 52 are not subject to FR 24, circuitry 120 may place one or more packets 52 in one or more receive queues 250. One or more application programs 44 then may access the one or more packets 52 in one or more receive queues 250 and may undertake further processing of one or more packets 52.

Thus, an embodiment may include network controller circuitry to be comprised in a host computer that includes a host processor to execute an operating system environment. The circuitry may be coupled to the processor, receive at least one packet via a network, store at least one firewall filter parameter set, and execute, based at least in part upon the parameter set and packet, at least one firewall filter action involving, at least in part, the packet. The action may implement, at least in part, at least one firewall rule supplied by a firewall application to an interface of a driver associated with the circuitry. The application may be executed, at least in part, in the environment. The circuitry may generate and store the parameter set based at least in part upon at least one command from the driver. The command may be based at least in part upon the rule.

In this embodiment, the vast majority of firewall filter operations, such as packet inspection, filtration decision making, and queue routing/dropping of packets, may be carried out in hardware (i.e., by NCC 118) and without use of software agents, the operating system environment, and the host processor. Advantageously, in this embodiment, this may offload the vast majority of these operations to the NCC 118. Advantageously, this may (1) reduce the amount of the host processor's processing bandwidth consumed to carry out these operations, and (2) reduce the host processor's power consumption and heat generation. Many other advantages will be apparent to those skilled in the art.

Many variations, modifications, and alternatives are possible without departing from this embodiment. For example, one or more FR 24 may be contingent, at least in part, upon one or more previously received packets. More specifically, in this example, one or more FR 24 may specify, at least in part, one or more contingencies that if a predetermined number of identical or similar packets (or types of packets) have already been received by host computer 10 from one or more sources, any additional identical or similar packets (or types of packets) may be subject to one or more firewall filter actions, but the previously received packets may not be subject to the one or more firewall filter actions. These one or more contingencies may be formulated, at least in part, so as to attempt to distinguish between what may be ordinary network traffic, and an attempted attack on the host computer 10 (e.g., a denial of service and/or other type of attack). Of course, many other modifications are within the purview of those skilled in the art.

What is claimed is:

1. An apparatus comprising:
network controller circuitry to be comprised in a host computer, the host computer including a host processor to execute an operating system environment, the network controller circuitry to be coupled to the host processor and to receive at least one packet via a network, the circuitry to store at least one firewall filter parameter set, the circuitry to execute, based at least in part upon the at least one parameter set and the at least one packet, at least one firewall filter action involving, at least in part, the at least one packet, the at least one action implementing, at least in part, at least one firewall rule supplied by a firewall application to an interface of a driver, the application being executed, at least in part, in the operating system environment, the circuitry to generate and store the at least one parameter set based at least in part upon at least one command from the driver, the at least one command being based at least in part upon the at least one rule, the at least one firewall rule specifying at least one contingency that if a predetermined number of identical packets have already been received from a source, and at least one additional packet that is identical to the identical packets is received from the source after the predetermined number of identical packets have been received, then the at least one additional packet is to be subject to the at least one action, but the predetermined number of identical packets are not to be subject to the at least one action, the at least one contingency being formulated, at least in part, so as to attempt to distinguish between ordinary network traffic and attempted denial of service attack.

2. The apparatus of claim 1, wherein:
the at least one firewall filter parameter set comprises a tuple of one or more firewall filter parameters that specify, at least in part, a packet flow.

3. The apparatus of claim 2, wherein:
the tuple comprises at least one of the following: a source address, a destination address, a source port, a destination port, a protocol identification, and a virtual local area network (VLAN) identification.

4. The apparatus of claim 2, wherein:
the one or more firewall filter parameters comprise a plurality of firewall filter parameters; and
the circuitry is to execute the at least one firewall filter action, based at least in part upon a subset of the plurality of firewall filter parameters.

5. The apparatus of claim 1, wherein:
the host processor is comprised in a circuit board;
the network controller circuitry is comprised at least in part in a circuit card to be coupled to the circuit board; and
the at least one firewall filter action comprises one of:
dropping the at least one packet; and
placing the at least one packet in a quarantine queue.

6. The apparatus of claim 5, wherein:
after the circuitry places the at least one packet in the quarantine queue, one or more applications in the operating system environment are to determine at least one further action, the at least one further action comprising one of:
dropping the at least one packet; and
permitting an application program executed by the host processor to receive the at least one packet.

7. A method comprising:
storing in network controller circuitry at least one firewall filter parameter set, the circuitry to be comprised in a host computer, the host computer including a host processor to execute an operating system environment, the network controller circuitry to be coupled to the host processor and to receive at least one packet via a network; and
executing by the circuitry, based at least in part upon the at least one parameter set and the at least one packet, at least one firewall filter action involving, at least in part, the at least one packet, the at least one action implementing, at least in part, at least one firewall rule, the at least one rule being supplied by a firewall application, the application being executed, at least in part, in the operating system environment, the circuitry to generate and store the at least one parameter set based at least in part upon the at least one rule, the at least one firewall rule specifying at least one contingency that if a predetermined number of identical packets have already been received from a source, and at least one additional packet that is identical to the identical packets is received from the source after the predetermined number of identical packets have been received, then the at least one additional packet is to be subject to the at least one action, but the predetermined number of identical packets are not to be subject to the at least one action, the at least one contingency being formulated, at least in part, so as to attempt to distinguish between ordinary network traffic and attempted denial of service attack.

8. The method of claim 7, wherein:
the at least one firewall filter parameter set comprises a tuple of one or more firewall filter parameters that specify, at least in part, a packet flow.

9. The method of claim 8, wherein:
the tuple comprises at least one of the following: a source address, a destination address, a source port, a destination port, a protocol identification, and a virtual local area network (VLAN) identification.

10. The method of claim 8, wherein:
the one or more firewall filter parameters comprise a plurality of firewall filter parameters; and
the circuitry is to execute the at least one firewall filter action, based at least in part upon a subset of the plurality of firewall filter parameters.

11. The method of claim 7, wherein:
the host processor is comprised in a circuit board;
the network controller circuitry is comprised at least in part in a circuit card to be coupled to the circuit board; and
the at least one firewall filter action comprises one of:
dropping the at least one packet prior to the at least one packet being placed in a queue in the host computer; and
placing the at least one packet in a quarantine queue.

12. The method of claim 11, wherein:
after the circuitry places the at least one packet in the quarantine queue, one or more applications in the operating system environment are to determine at least one further action, the at least one further action comprising one of:
dropping the at least one packet; and
permitting an application program executed by the host processor to receive the at least one packet.

13. Computer-readable memory storing one or more instructions that when executed by a machine result in performance of operations comprising:
storing in network controller circuitry at least one firewall filter parameter set, the circuitry to be comprised in a host computer, the host computer including a host processor to execute an operating system environment, the network controller circuitry to be coupled to the host processor and to receive at least one packet via a network; and
executing by the circuitry, based at least in part upon the at least one parameter set and the at least one packet, at least one firewall filter action involving, at least in part, the at least one packet, the at least one action implementing, at least in part, at least one firewall rule, the at least one rule being supplied by a firewall application to an interface of a driver associated with the circuitry, the application being executed, at least in part, in the operating system environment, the circuitry to generate and store the at least one parameter set based at least in part upon at least one command from the driver, the at least one command being based at least in part upon the at least one rule, the at least one firewall rule specifying at least one contingency that if a predetermined number of identical packets have already been received from a source, and at least one additional packet that is identical to the identical packets is received from the source after the predetermined number of identical packets have been received, then the at least one additional packet is to be subject to the at least one action, but the predetermined number of identical packets are not to be subject to the at least one action, the at least one contingency being formulated, at least in part, so as to attempt to distinguish between ordinary network traffic and attempted denial of service attack.

14. The memory of claim 13, wherein:
the at least one firewall filter parameter set comprises a tuple of one or more firewall filter parameters that specify, at least in part, a packet flow.

15. The memory of claim 13, wherein:
the tuple comprises at least one of the following: a source address, a destination address, a source port, a destination port, a protocol identification, and a virtual local area network (VLAN) identification.

16. The memory of claim 14, wherein:
the one or more firewall filter parameters comprise a plurality of firewall filter parameters; and the circuitry is to execute the at least one firewall filter action, based at least in part upon a subset of the plurality of firewall filter parameters.

17. The memory of claim 16, wherein:
the host processor is comprised in a circuit board;
the network controller circuitry is comprised at least in part in a circuit card to be coupled to the circuit board; and
the at least one firewall filter action comprises one of:
   dropping the at least one packet prior to the at least one packet being placed in a queue in the host computer; and
   placing the at least one packet in a quarantine queue.

18. The memory of claim 17, wherein:
after the circuitry places the at least one packet in the quarantine queue, one or more applications in the operating system environment are to determine at least one further action, the at least one further action comprising one of:
   dropping the at least one packet; and
   permitting an application program executed by the host processor to receive the at least one packet.

19. The apparatus of claim 1, wherein:
the at least one rule is contingent, at least in part, upon one or more previously received packets.

* * * * *